(12) United States Patent
Farhat et al.

(10) Patent No.: US 8,282,962 B2
(45) Date of Patent: Oct. 9, 2012

(54) WATER-DISPERSIBLE XANTHAN GUM CONTAINING COMPOSITION

(75) Inventors: Imad Akil Farhat, Loughborough (GB); Sandra Elizabeth Hill, Hillview House Nether Broughton Country (GB); John Richard Mitchell, Kegworth (GB); Udo Scharf, Weiler (DE); Nuno Miguel Fernandes Diogo Sereno, Tv. Simoes Almeida (PT); Peter Stolz, Koenigswinter (DE)

(73) Assignees: CSM Nederland B.V., Diemen (NL); The University of Nottingham, Nottingham (GB)

( * ) Notice: Subject to any disclaimer, the term of this patent is extended or adjusted under 35 U.S.C. 154(b) by 1045 days.

(21) Appl. No.: 11/721,963

(22) PCT Filed: Dec. 15, 2005

(86) PCT No.: PCT/NL2005/050078
§ 371 (c)(1),
(2), (4) Date: Jan. 25, 2008

(87) PCT Pub. No.: WO2006/065136
PCT Pub. Date: Jun. 22, 2006

(65) Prior Publication Data
US 2008/0220081 A1    Sep. 11, 2008

(30) Foreign Application Priority Data
Dec. 15, 2004 (WO) ............... PCT/GB2004/005284

(51) Int. Cl.
*A61K 9/50* (2006.01)
*A23L 1/05* (2006.01)
*A23D 9/013* (2006.01)
(52) U.S. Cl. ............... 424/500; 426/661; 426/531
(58) Field of Classification Search .............. None
See application file for complete search history.

(56) References Cited

U.S. PATENT DOCUMENTS

| | | | |
|---|---|---|---|
| 4,105,461 A | 8/1978 | Racciato | |
| 4,260,741 A | 4/1981 | Schuppner, Jr. | |
| 4,298,729 A | 11/1981 | Cheng et al. | |
| 4,357,260 A | 11/1982 | Sandford et al. | |
| 4,363,669 A | 12/1982 | Cottrell et al. | |
| 4,525,575 A | 6/1985 | Yeater | |
| 4,654,086 A | 3/1987 | Baird et al. | |
| 5,003,060 A | 3/1991 | Vinot | |
| 5,416,206 A | 5/1995 | Nagura et al. | |
| 5,633,028 A * | 5/1997 | Wong .......................... | 426/99 |
| 6,001,402 A * | 12/1999 | Dupont ....................... | 426/249 |
| 6,001,408 A | 12/1999 | Dudacek et al. | |
| 6,391,352 B1 * | 5/2002 | Hawkes et al. ............... | 426/96 |
| 6,391,596 B1 | 5/2002 | Talashek et al. | |
| 2003/0124195 A1 | 7/2003 | Delprato et al. | |

FOREIGN PATENT DOCUMENTS

| | | |
|---|---|---|
| EP | 0 102 269 B1 | 12/1986 |
| EP | 0 658 596 B1 | 6/2001 |
| FR | 2362893 | 3/2978 |
| WO | WO 01/83565 * | 11/2001 |
| WO | WO-01/83565 A1 | 11/2001 |
| WO | WO-01/87987 A1 | 11/2001 |

OTHER PUBLICATIONS

Hanna et al, "Extrudates of Starch-Xanthan Gum Mixtures as Affected by Chemical Agents and Irradiation," Journal of Food Science, vol. 62, No. 4, 1997, pp. 816-819.
International Search Report for PCT/GB2004/005284 dated Sep. 5, 2005, 5 pages.
International Search Report for PCT/NL2005/050078 dated Apr. 5, 2006, 3 pages.
Katzbauer, "Properties and applications of xanthan gum," Polymer Degradation and Stability, Jan. 1998, pp. 81-84, vol. 59, No. 1-3, Barking, Great Britain.
Kuhn et al., "Kochextrusion von stark emit hydrokolloiden," Starke 013 Starch, Dec. 1, 1989, pp. 467-471, vol. 41, No. 12, Wiely-VCH Verlag, Weinheim, Germany.
Miladinov et al., "Apparent viscosity of starch and xanthan gum extruded with crosslinking agents," Industrial Crops and Products, vol. 4, 1995 pp. 261-271 [XP008049787].
Miladinov et al., Industrial Corps and Products, vol. 5, 1996, pp. 183-188.
Salvador et al., "Rheological properties of xanthan gum-gelatine spray-dried mixtures," European Food Research and Technology, vol. 212, 2001, pp. 208-212 [XP008049788].

* cited by examiner

*Primary Examiner* — Brian Gulledge
(74) *Attorney, Agent, or Firm* — Gilberto M. Villacorta; Sunit Talapatra; Foley & Lardner LLP

(57) ABSTRACT

One aspect of the present invention relates to a readily water-dispersible particulate composition comprising by weight of dry matter at least 10% of xanthan gum and not more than 60% of starch, said composition being characterized in that the xanthan gum present in the composition can be dispersed completely within 2 minutes in distilled water of 25° C. at a concentration of 0.7% based on the dry weight of xanthan. The particulate xanthan gum compositions of the present invention exhibit unique viscosity enhancing properties that are dependent on the electrolyte levels of the aqueous environment in which they are applied. The favorable properties of the xanthan compositions according to the invention can be realized without resorting to chemical modification of the xanthan gum. The xanthan compositions according to the present invention can be applied advantageously in e.g. food products and oil drilling fluids.

18 Claims, 2 Drawing Sheets

WATER-DISPERSIBLE XANTHAN GUM CONTAINING COMPOSITION

TECHNICAL FIELD OF THE INVENTION

The present invention relates to a particulate composition containing xanthan gum that is readily dispersible in water. Another aspect of the invention concerns a highly viscous aqueous dispersion of discrete swollen particles that contains xanthan gum. Yet another aspect of the invention relates to a process for the manufacture of a readily water dispersible particulate composition containing xanthan gum.

BACKGROUND OF THE INVENTION

The fermentative production of the water-soluble polysaccharide xanthan gum by the action of *Xanthomonas* bacteria is well known. *Xanthomonas* hydrophilic colloid ("xanthan") is an exocellular heteropolysaccharide. The heteropolysaccharide has a backbone chain of (1→4)β-glucose residues substituted by short, lateral chains linked to alternate monomeric residues of the main chain. Xanthan has a wide variety of industrial applications including use as a thickener, a stabilizing agent and a suspending agent, especially in foods. Furthermore, xanthan is used in oil well drilling muds and as a viscosity control additive in secondary recovery of petroleum by water flooding. Xanthan can also be used in cosmetic preparations, pharmaceutical delivery systems and similar compositions.

Xanthan is produced on an industrial scale by aerobic submerged fermentation of a bacterium of the genus *Xanthomonas*. The fermentation medium contains carbohydrate (such as sugar), trace elements and other nutrients. Once fermentation is complete, the resulting fermentation broth is heat-treated. Following heat-treatment, the xanthan is recovered by alcohol precipitation.

A well-recognised difficulty with xanthan gum has been its resistance to dispersibility and hydration. Typically, xanthan gum powder must be subjected to high agitation to get it to disperse and hydrate. Once dispersal and wetting are accomplished the hydration of the gum, as evidenced by the development of viscosity, is quite rapid.

In order to make xanthan gum more readily water-dispersible, several solutions have been proposed in the prior art.

U.S. Pat. No. 4,357,260 describes a dispersible xanthan gum composite consisting essentially of xanthan gum and silica wherein the ratio of xanthan gum to silica ranges from about 19:1 to 1:1.

U.S. Pat. No. 4,363,669 describes a dispersible, dry blend of glyoxal-treated xanthan gum and a non-dispersible plant gum selected from the group consisting of guar gum, tara gum, cold-water soluble tamarind gum, and cold-water soluble locust bean gum.

U.S. Pat. No. 4,654,086 is concerned with a dispersible blend consisting essentially of xanthan gum and a surfactant, which is one or more of lecithin, polyglycerol ester, propylene glycol ester, polyoxyethylene sorbitan ester, sorbitan ester, sodium stearoyl-2actylate, stearyl-2-lactylic acid, or polyoxylstearate, wherein the weight ratios of xanthan gum: surfactant range from 95:5 to 80:20.

U.S. Pat. No. 5,003,060 describes solid porous xanthan granules that are readily dispersible and soluble in water, said granules comprising at least one wetting agent, dispersing agent or a combination thereof.

Industrial applications of xanthan gum are primarily based on the polysaccharide's viscosity enhancing properties. Although xanthan gum is capable of producing highly viscous aqueous systems at relatively low concentrations, it would be highly advantageous to reduce the so called cost-in-use of xanthan gum by further improving the viscosity enhancing properties of xanthan gum.

U.S. Pat. No. 6,391,596 describes a high viscosity xanthan gum. This xanthan gum is characterised in that it has a sea water viscosity greater than 25 dial reading when dissolved in sea water to 0.29 weight percent.

U.S. Pat. No. 5,416,206 relates to a saline soluble xanthan gum having a viscosity of not less than 800 cP as determined on a 0.5% by weight solution thereof in a 12% by weight aqueous sodium chloride solution at 20° C. at 30 rpm using a Brookfield BL viscometer and having a ratio of this viscosity to that determined on a 0.5% by weight solution thereof in distilled water of not less than 1.5.

Kuhn et al. (Starch/Stäarke 41(12), 1989, 467-471) describe the results of experiments involving cooking extrusion of starch with hydrocolloids, including xanthan gum. The authors observe that cooking extrusion of starch with 5-30% xanthan gave products of high viscosity. The results presented in the article suggest that a co-extrudated blend of 5% xanthan and 95% corn starch exhibits a significantly higher viscosity than a dry mixed blend of 95% extruded corn starch and 5% xanthan.

Miladinov et al. (Industrial Corps and Products, 5 (1996), 183-188) describe experiments in which the viscous properties of starch and xanthan gum co-extruded with injection of adipoyl chloride were determined. Viscosities of aqueous solutions of ground extruded and non-extruded samples were compared. Extruded samples were found to have higher viscosities in distilled water solutions than the nonextruded materials.

SUMMARY OF THE INVENTION

The inventors have developed a xanthan gum containing particulate composition that is readily water-dispersible. The particulate xanthan gum containing composition according to the present invention contains not more than 60% starch It can be prepared to a range of particle sizes depending e.g. on milling and subsequent sieving. Typically, these would be in the range 10-1000 μm The excellent water dispersibility of the present particulate composition is demonstrated by the fact that the xanthan gum present in the composition can be dispersed completely within 2 minutes in distilled water of 25° C. at a concentration of 0.7% based on the dry weight of xanthan using a method comprising introducing 500 ml of distilled water to a beaker of 1000 ml, stirring with a stirrer with a four bladed impeller with a diameter of 5 cm, operating at fixed rate of 300 rpm and adding the xanthan containing particulate composition to give a concentration of 0.7% based on the dry weight of xanthan.

The particulate xanthan gum compositions of the present invention exhibit unique viscosity enhancing properties. When applied in aqueous systems with very low electrolyte levels, the present composition is capable of imparting extraordinarily high viscosities within a short period of time. This favourable characteristic of the present composition is particularly manifest in compositions in which electrolyte levels are very low. Typically, a dispersion obtained by completely dispersing a low electrolyte composition according to the present invention in distilled water at a concentration of 0.7% xanthan as described herein before exhibits a viscosity of at least 2000 mPa·s at 25° C. (Brookfield model LVF viscometer or equivalent, spindle 3, 12 rpm).

Whereas the present compositions are capable of imparting unusually high viscosities in aqueous systems with very low electrolyte levels, the reverse is true when the present xanthan compositions are applied in aqueous systems that contain high electrolyte levels, i.e. the observed viscosity increase is unusually low. The regulations of the U.S. Foods and Drug Administration prescribe that xanthan gum may be used in food if it meets a number of requirements. One such requirement (21CFR172.695—revised version of Apr. 1, 2004) is that "an aqueous solution containing 1 percent of the additive and 1 percent of potassium chloride stirred for 2 hours has a minimum viscosity of 600 centipoise (600 mPa·s) at 75 ° F. (23.8° C.), as determined by Brookfield Viscometer, Model LVF (or an equivalent model such as the Brookfield Model LVT viscometer), using a No. 3 spindle at 60 r.p.m.". Surprisingly, we have found that the xanthan compositions according to the present invention, when subjected to this test procedure, typically exhibit a viscosity of less than 300 mPa·s. When the present composition is applied in a high electrolyte aqueous system, subsequent heating to temperatures of up to 100° C. will induce a pronounced viscosity increase that is maintained after cooling down. Thus, in salt solutions viscosity development on heating resembles that of starches, but products thickened by xanthan offer the advantages of freeze thaw and storage stability without the use of chemical modification.

Thus, the particulate xanthan gum containing composition according to the present invention offers the significant benefit that they can combine easy water-dispersibility with significantly improved viscosity enhancing properties, wherein said viscosity enhancing properties can be controlled by manipulating the electrolyte concentration in said composition and/or in the products in which it is applied. Furthermore, the invention offers the advantage that the aforementioned favourable properties can be realised without resorting to chemical modification of the xanthan gum.

The present particulate composition can be obtained by a simple physical process comprising
 a. extruding a mixture containing between 20 and 60 wt. % water and at least 10% of xanthan gum and not more than 60% starch by weight of dry matter at a temperature of at least 60° C.;
 b. drying the resulting extrudate; and
 c. converting the extrudate into a particulate composition prior, during or after the drying,
wherein no adipoyl chloride is added during steps a. and b.

Although the inventors do not wish to be bound by theory, it is believed that the advantageous properties of the present particulate composition are a consequence of the presence of intermolecular linkages acting to maintain the particulate structure. These linkages may result from the melting and subsequent reformation of the xanthan ordered structure in an environment containing relatively low levels of water. In such a low water environment the rate of reformation of the xanthan ordered structure is reduced resulting in a network of molecules linked together non-covalently to form the particulate structure. Because of the polyelectrolyte character of xanthan these particles behave like superswelling polyelectrolyte gels and therefore in water in the absence of salt or other electrolytes can give a viscosity much higher than molecularly dissolved xanthan.

Because xanthan on dispersion is substantially retained in the particles, bridging and clumping involving xanthan molecules released at the powder particle surface does not occur. Thus, the well known clumping behaviour resulting in the formation of "fish eyes" on dispersion in water is not observed with the present xanthan composition. If desired, following this rapid dispersion a molecular solution can easily be obtained by subsequent heating to disrupt the particulate structure. When the present xanthan compositions are applied in salt solutions, the extent of swelling of the particles will be low, and subsequent disruption of the particulate structure on heating will result in an irreversible viscosity increase as seen for starch.

DETAILED DESCRIPTION OF THE INVENTION

Figure 1:
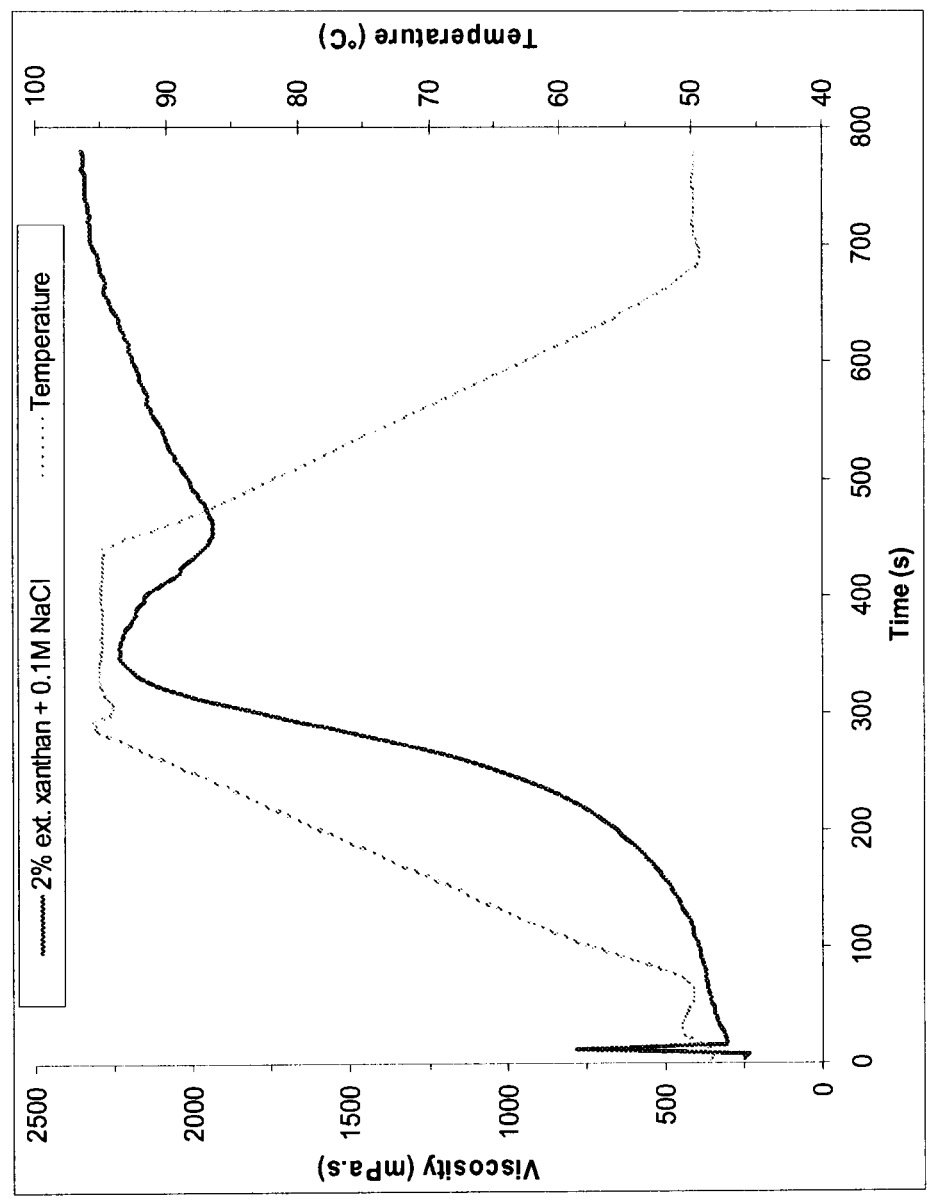
FIG. 1: Shows the Temperature and Viscosity Profile of Particulate Xanthan in Rapid Viscosity Analyser.

Accordingly, one aspect of the present invention relates to a readily water-dispersible particulate composition comprising by weight of dry matter at least 10% of xanthan gum and not more than 60% of starch, said composition being characterised in that the xanthan gum present in the composition can be dispersed completely within 2 minutes in distilled water of 25° C. at a concentration of 0.7% based on the dry weight of xanthan using a method comprising introducing 500 ml of distilled water to a beaker of 1000 ml, stirring with a stirrer with a four bladed impeller with a diameter of 5 cm, operating at fixed rate of 300 rpm and adding the xanthan containing particulate composition to give a concentration of 0.7% based on the dry weight of xanthan.

The term "particulate" as used herein shall be interpreted broadly and held to comprise particles of any porosity and or density. According to a preferred embodiment, the present particulate composition is a free flowing composition. The present particulate composition may suitably be composed of particles of homogenous composition as well as of particles in the form of e.g. agglomerates or encapsulates. Typically, the particles in the present composition exhibit a volume weighted average particle size in the range of 10-1000 μm.

The term "xanthan" or "xanthan gum" as used herein means the extracellularly produced heteropolysaccharide made by a bacterium of the genus *Xanthomonas*. Examples of *Xanthomonas* species that may suitably be used to produce xanthan gum include *Xanthomonas campestris, Xanthomonas begonias, Xanthomonas malvaceraum, Xanthomonas carotae, Xanthomonas incanae, Xanthomonas phaseoli, Xanthomonas vesicatoria, Xanthomonas papavericola, Xanthomonas translucens, Xanthomonas vesicatoria*, and *Xanthomonas hedrae*.

The advantages of the present invention may be realised in a particulate composition that essentially consists or xanthan gum as well as in a composition that besides xanthan gum contains one or more additional ingredients. Examples of additional ingredients that may suitably be incorporated in the present particulate compositions include polysaccharides, proteins, emulsifiers synthetic polymers and sugars. Preferably these additional ingredients are water soluble. Examples of polysaccharides that may suitably be incorporated in the present composition include starch, cereal flours, locust bean gum, maltodextrins and combinations thereof. Examples of proteins include soya protein, casein and gluten. Suitable sugars include sucrose, glucose and glucose syrups. Such co-processed blends can combine the beneficial functionality of the particulate form of xanthan gum and the additional ingredient. For example, the use of xanthan gluten blends in baked products.

Typically, the present composition contains at least 20% of xanthan gum by weight of dry matter. More preferably, the present composition contains at least 40% xanthan gum and most preferably, it contains at least 50% of xanthan gum by weight of dry matter.

The amount of starch contained in the present particulate compositions preferably does not exceed 50%, more preferably it does not exceed 40% and most preferably it does not exceed 30% by weight of dry matter.

The present composition may suitably contain locust bean gum. Preferably, however, the composition contains not more than 60% locust bean gum by weight of dry matter. Likewise, in a preferred embodiment, the composition contains not more than 70% maltodextrin, preferably not more than 50% maltodextrin by weight of dry matter. Furthermore, the present composition preferably contains not more than 80% protein, more preferably not more than 70% protein by weight of dry matter.

As mentioned herein before, the particulate xanthan compositions according to the present invention, besides being readily water dispersible, preferably exhibit another extraordinary and favourable characteristic, namely that their viscosity enhancing capability is very low in aqueous systems that contain high concentrations of electrolytes. According to this preferred embodiment, the present composition, when subjected to a first viscosity measurement as described in Section 172.695 of the U.S. Food and Drug Administration, yields a viscosity of less than 500 mPa·s at 23.8° C., said first viscosity measurement comprising the steps of (a) adding the composition to an aqueous solution containing 1 wt. % potassium chloride to give an aqueous composition containing 1 wt. % xanthan gum; (b) stirring for 2 hours; and (c) determining the viscosity of the stirred aqueous composition by Brookfield viscometer Model LVF or equivalent using a No. 3 spindle at 60 rpm; and wherein said aqueous stirred composition when subjected to a second viscosity measurement yields viscosity of at least 600 mPa·s at 23.8° C., said second viscosity measurement comprising the steps of (a) heating the stirred aqueous composition immediately after the first viscosity measurement to a temperature of 100° C.; (b) maintaining a temperature of 100° C. for one minute; (c) cooling to 23.8° C. within 120± 10 minutes; and (d) determining the viscosity by Brookfield viscometer Model LVF viscometer or equivalent using a No. 3 spindle at 60 rpm.

In accordance with an especially advantageous embodiment of the invention, the first viscosity measurement of the present particulate composition yields a viscosity of less than 400 mPa·s at 23.8° C., more preferably of less than 300 mPa·s at 23.8° C., and most preferably of less than 200 mPa·s at 23.8° C.

In accordance with another preferred embodiment of the invention the present particulate composition, when subjected to a first viscosity measurement and a second viscosity measurement as defined above, yields a viscosity from the second viscosity measurement that is at least 50%, preferably at least 100% higher than the viscosity from the first viscosity measurement, the observed viscosity increase being largely attributable to the xanthan gum contained in the composition. This particular embodiment also encompasses particulate compositions that, besides xanthan gum, contain one or more other viscosifying agents. Due to the special properties of the xanthan gum contained in the present compositions, a significant increase in viscosity will also be observed in the second viscosity measurement if the viscosity determined in the first viscosity measurement was relatively high due to the presence of one or more other viscosifying agents. It is well-known in the art that the viscosity enhancing capacity of certain viscosifying agents, such as starch, is irreversibly enhanced by heating. The aforementioned observed viscosity increase, however, is largely attributable to the xanthan gum. Thus, although the particulate composition according to this embodiment may contain viscosifying agents whose viscosity enhancing properties are irreversibly enhanced by heating, said composition will contain not more than marginal levels of these viscosifying agents. Most preferably, the particulate composition according to this embodiment is essentially free from viscosifying agents, other than xanthan gum, whose viscosity enhancing properties in water are irreversibly enhanced by heating.

The present invention also encompasses a process for preparing a xanthan gum solution wherein a heat-sensitive particulate composition as defined above is dispersed in a liquid aqueous composition and is heated to a temperature sufficient to denature the ordered form of the xanthan gum. Denaturation of the ordered form of the xanthan gum is accompanied by a significant viscosity increase. Thus, it is possible to advantageously use these particulate compositions to quickly produce an easy pumpable aqueous xanthan dispersion that can be converted into a much more viscous system by simple heating.

According to a particularly preferred embodiment of the invention, the particulate composition combines easy water-dispersibility with significantly improved viscosity enhancing properties. These improved viscosity enhancing properties can be demonstrated by measuring the viscosity of the dispersion that is obtained dispersing the composition in distilled water of 25° C. at a concentration of 0.7 wt. % xanthan gum as described herein before. After the 2 minutes of stirring following xanthan addition, said dispersion typically exhibits a viscosity of at least 2000 mPa·s at 25° C., said viscosity being measured by a Brookfield model LVF viscometer or equivalent using spindle 3 at a rotational speed of 12 rpm.

The present particulate composition in the absence of significant levels of electrolytes offers the advantage that it can be used in relatively small quantities to impart a very significant viscosity increase within a very brief time period. This advantageous feature is demonstrated by the fact that the composition, when introduced in distilled water of 25° C. at a concentration of 0.7%, based on the dry weight of xanthan, after 2 minutes of stirring yields a dispersion having a viscosity of at least 2000 mPa·s at 25° C. Typically, the present composition, under the aforementioned conditions, yields a dispersion having a viscosity of at least 3000 mPa·s at 25° C., more preferably of at least 4000 mPa·s at 25° C. The extraordinary fast viscosity increase that can be achieved with the present particulate composition is also evidenced by the fact that after the complete dispersion of the xanthan gum in not more than 2 minutes, no substantial further increase of viscosity is observed. In other words, the viscosity at 25° C. of the dispersion obtained after the 2 minutes of stirring does not increase by more than 100% on further stirring for 20 minutes. In contrast, commercially available particulate xanthan preparations show viscosity increases of typically of the order of 300% under these same conditions.

The aqueous dispersion obtained after the 2 minutes of stirring following xanthan addition typically shows a reduction in viscosity to less than one third (33%), preferably to less than one fifth (20%) of the original value when solid NaCl is added and fully dissolved to give an ionic strength of 0.05M. This salt sensitivity is a consequence of the polyelectroyte character of the particles. When the particulate composition of the present invention is dispersed in a salt solution the viscosity will be low. However, on heating and subsequent cooling viscosity is developed irreversibly; a feature that it is highly advantageous in food compositions that are subjected to heating during manufacture or preparation.

The inventors have observed that in case the present readily dispersible composition contains significant amounts, e.g. at least 10 wt. %, of polysaccharide or protein in addition to xanthan gum, the rate of viscosity increase observed when the composition is dispersed in distilled water may be somewhat reduced. Typically, these compositions that contain at least 10% polysaccharide or protein by weight of xanthan gum are characterised in that the dispersion obtained after 10 minutes of stirring following the xanthan addition exhibits a viscosity of at least 2000 mPa·s at 25° C., said viscosity being measured by a Brookfield model LVF viscometer or equivalent, using spindle 3 at a rotational speed of 12 rpm. Preferably, after 10 minutes of stirring the dispersion has a viscosity of at least 3000 mPa·s at 25° C., more preferably of at least 4000 mPa at 25° C.

The advantageous viscosity enhancing properties of the present composition are dependent on salt/electrolyte levels. If the composition is applied in an aqueous environment containing significant levels of electrolytes, the viscosity enhancing properties of the present composition may be less pronounced. Hence, in a preferred embodiment of the invention, the present composition contains relatively low levels of electrolytes such that the ionic strength of a dispersion of the material containing 0.7% xanthan will give an ionic strength equivalent to equal or less than about 0.025% NaCl (i.e. an ionic strength of less than 0.005M).

The present invention also encompasses particulate xanthan compositions that contain significant levels of electrolytes. The particulate compositions according to this embodiment offer the advantage that they are readily dispersible in water and initially do not yield a highly viscous aqueous phase. However, by heating the dispersion thus obtained to sufficiently high temperatures to denature the ordered form of the xanthan gum the viscosity of the dispersion may be increased significantly. Thus, it is possible to use such electrolyte containing compositions to quickly produce an easy pumpable aqueous xanthan dispersion that can be converted into a much more viscous system by simple heating. It is thus possible to replace flours or starches by these xanthan containing materials at appropriate xanthan and electrolyte concentrations. Such a material has the advantage that it does not show the retrogradation and poor freeze thaw stability associated with native starches.

Accordingly, another embodiment of the invention relates to a xanthan composition, wherein the dispersion obtained after 10 minutes of stirring, following the xanthan addition to distilled water in a concentration of 0.7 wt. % as described herein before, exhibits an ionic strength of at least 0.005 M and a viscosity of less than 2000 mPa.s, and in that the same dispersion shows an increase in viscosity of at least 300% after having been heated to a temperature of 100° C. for 1 minute, both viscosities being measured at 25° C. by a Brookfield model LVF viscometer or equivalent using spindle 3 at a rotational speed of 12 rpm. According to a particularly preferred embodiment the dispersion obtained after the 10 minutes of stirring exhibits an ionic strength of at least 0.01M, preferably of at least 0.05M.

Another special property of the present particulate composition becomes manifest when the composition has been dispersed completely in an aqueous environment. When viewed under a microscope, prior to heating, the hydrated xanthan containing particles can be easily identified as discrete swollen particles. In contrast, commercially available particulate xanthan preparations, following complete dispersal in water will disperse to a state where the original particles can no longer be distinguished. Accordingly, in a preferred embodiment the present particulate composition is characterised in that, following the complete dispersion of the xanthan gum in distilled water, said xanthan gum is mainly present in the resulting aqueous dispersion in the form of discrete swollen particles. The volume of these swollen particles will depend on the particle size of the original dry material. Typically, in distilled water in the absence of other electrolytes the particles when in isolation will swell to give an increase in mean dimension by a factor of 5 to 15. The term "swollen particles" whenever used herein, refers to particles that have been fully hydrated and that have substantially increased in volume as a result of hydration.

Yet another special and preferred feature of the present composition concerns the tendency of an aqueous dispersion of the present composition to exhibit very substantial viscosity changes on heating to temperatures in excess of 70° C. Typically, the present composition is characterised in that one hour after the complete dispersion of said composition in distilled water at a xanthan concentration of 0.7% as described herein before the viscosity of the resulting dispersion at 25° C. is at least 4 times higher than the viscosity at 25° C. of the aqueous system obtained after heating the same dispersion to 100° C. for 1 minute.

While not wishing to be bound by any intepretation it is believed that this is because the xanthan contained in the present particulate composition reverts to molecular xanthan. We postulate that special properties of the xanthan in the present particulate composition are a consequence of a molecular xanthan network maintained through double helical structures which maintain molecular xanthan in the ordered form. Evidence for this comes from investigations of the temperature of the denaturation measured for 0.75% particulate xanthan prepared in a range of salt concentrations. A Setaram Micro DSC III (Setaram, Caluire, France) was used to measure thermal changes. The sample mass used was about 700 mg, and baselines were obtained with distilled water. The distilled water in the sample pan was then substituted by the xanthan gum dispersion and both pans were placed in the microcalorimeter. Stainless steal pans (hastalloy) with a diameter of 9 mm and a usable volume of 1 ml were used.

The cells were then heated from 20° C. to 120° C. at 1° C./min, and the xanthan gum thermal transition observed. The cells were then cooled down to 20° C. at 1° C./min. The re-heating to 120° C. with subsequent re-cooling to 20° C. at 1° C./min followed. Peak temperature (onset and offset) and the energy absorbed or released during the xanthan gum thermal transition was calculated using the Setsoft software (version 1.35) provided with the Micro DSC III. Peak enthalpy was calculated from the area between the curve and the appropriated baseline. The enthalpy values (ΔH) were determined in Joule per gram of dry xanthan gum. All measurements were performed in duplicate. The denaturation temperature measured in this way was compared with the temperature of the viscosity peak when the samples were heated in a Rapid Viscosity Analyser. At this concentration we interpret the observed peak in viscosity as due to the swelling (increasing viscosity) and subsequent disruption (decreasing viscosity) of the xanthan particles due to the denaturation of the xanthan helices maintaining the particulate structure.

A further consequence of the special behaviour of the xanthan gum contained in the present particulate composition is that a molecular dispersed xanathan solution can be rapidly and conveniently prepared by dispersing the particulate material and then subsequently heating to disrupt the particulate structure. Where the dispersion contains salts or other electrolytes and the concentration is higher than approximately 1% a consequence of this can be a viscosity increase on heating. This increase in viscosity at higher temperatures in the presence of salts and other electrolytes can be of value in food applications involving heating. For example, in the preparation of baked products and pasteurised or sterilised foods. It also enables high concentration solutions of xanthan gum to be conveniently prepared in salt environments which is of considerable benefit in oil well drilling applications.

The present particulate composition may contain a significant amount of water. Preferably, the amount of water does not exceed the level at which the free flowing characteristics of the composition are impaired. Typically the present composition contains from 0-20 wt. %, preferably from 5-15 wt. % water.

As mentioned herein before, the advantageous properties of the present composition may be obtained without the need of chemically treating the xanthan gum with e.g. glyoxal. Thus, in a preferred embodiment, the xanthan gum contained in the present composition has not been chemically cross-linked or treated with glyoxal. Even more preferably, said xanthan gum has not been chemically treated. Here the term "chemically treated" refers to the alteration of the chemical nature of the xanthan gum as a result of chemical reaction between reactive groups in the polysaccharide and a chemical agent.

The present composition may suitably contain an added surfactant in order to further enhance the dispersibility of the composition. Examples of surfactants that may suitably be incorporated in the present composition include lecithin, polyglycerol ester, propylene glycol ester, polyoxyethylene sorbitan ester, sorbitan ester, sodium stearoyl-2actylate, stearyl-2-lactylic acid, polyoxylstearate and any combinations thereof. Preferably, the weight ratio of xanthan gum: surfactant in the present composition exceeds 95:5, more preferably it exceeds 97:3.

The particulate composition of the invention can be obtained by extruding an aqueous slurry of xanthan gum under relatively mild conditions. Consequently, in another preferred embodiment, the present composition is obtainable by extruding a slurry containing at least 10% xanthan gum by weight of dry matter and between 5 and 60 wt. % water at a temperature below 100° C.

Yet another aspect of the present invention is concerned with an aqueous dispersion of discrete swollen particles, said swollen particles containing at least 10% xanthan gum by weight of dry matter, said dispersion being free of starch or containing starch in an amount of less than 100% by weight of xanthan gum, wherein the diameter of the swollen particles (after hydration), when the dispersion is stored at 20° C. for 24 hours, does not change by more than 30%. The stability of the swollen particles in the present dispersion is maintained through non-covalent interactions between xanthan molecules. In other words, this stability is advantageously achieved without the use of e.g. crosslinking agents.

The present particulate composition, when dispersed in cold water, produces a dispersion of swollen xanthan particles that do not disintregrate and dissolve. Several advantageous Theological properties are associated with the fact that the swollen particles in the present dispersion are stable over time. According to a very preferred embodiment, the diameter of the swollen particles in the present dispersion, when stored at 20° C. for 24 hours, does not change by more than 20%, preferably it does not change by more than 10%, most preferably it does not change by more than 5%.

According to another preferred embodiment, the present dispersion is further characterised by a viscosity at 25° C. that is at least 5 times higher than the viscosity at 25° C. of the aqueous system obtained after heating the dispersion to 100° C. for 1 minute, said viscosities being measured by a Brookfield model LVF viscometer or equivalent using spindle 3 at a rotational speed of 12 rpm.

The amount of xanthan gum contained within the swollen particles preferably is at least 50%, more preferably at least 70% and most preferably at least 90% by weight of dry matter. The amount xanthan gum contained in the aqueous dispersion preferably is at least 0.1 wt. %, more preferably at least 0.2 wt. % and most preferably at least 0.3 wt. %. Typically, the amount of xanthan in the aqueous dispersion will not exceed 30 wt. %, more preferably it will not exceed 10 wt. % and most preferably it will not exceed 4 wt. %.

A further aspect of the present invention relates to a food product comprising an aqueous dispersion as defined above. In a preferred embodiment said food product is selected from the group consisting of desserts, fillings, sauces, batters, doughs, baked products and spreads.

Another aspect of the invention concerns a drilling fluid comprising an aqueous dispersion as defined herein before.

Yet another aspect of the invention concerns a pharmaceutical composition comprising the aforementioned aqueous dispersion and a pharmaceutically active substance. The pharmaceutical composition may be in the form of oral liquid preparations as well as in the form of injectable and infusable solutions or suspensions. The pharmaceutical composition may also take the form of a capsule, a suppository or a transdermal device holding the aforementioned aqueous dispersion and a pharmaceutically active substance. The pharmaceutically active substance is contained within or surrounding the swollen particles of the xanthan dispersion. By incorporating the active substance within the swollen particles, release of the active substance can be controlled effectively. Thus, also the pharmacological effect of the active substance may be delivered in a controlled fashion after administration of the pharmaceutical composition to a human or an animal.

A final aspect of the present invention relates to processes of manufacturing a readily water-dispersible particulate composition containing at least 10% xanthan gum by weight of dry matter. In one embodiment, said process comprises
a. extruding a mixture containing between 20 and 60 wt. % water and at least 10% of xanthan gum and not more than 60% starch by weight of dry matter at a temperature of at least 60° C.;
b. drying the resulting extrudate; and
c. converting the extrudate into a particulate composition prior, during or after the drying,
wherein no adipoyl chloride is added during steps a. and b. In an alternative embodiment the aforementioned manufacturing process comprises:
a. providing a suspension containing between 20 and 96 wt. % water and at least 10% of xanthan gum and not more than 60% starch by weight of dry matter;
b. drying the suspension to a water content greater than 10 wt. % by means of roller drying employing drying temperatures of at least 100° C.;
c. converting the roller dried suspension into a particulate composition by drying at temperature of at least 60° C.
wherein no adipoyl chloride is added during steps a. and b.

Incorporation of salts or other polyelectrolytes in the xanthan blend prior to processing and drying will result in ready dispersible particles that have a low viscosity compared with molecular xanthan when dispersed in water.

The invention is further illustrated by means of the following examples.

EXAMPLES

Example 1

Xanthan gum (Satiaxane CX 910, Degusa Texturant Systems, France) was extruded with a Twin Screw Clestral BC12 Extruder (Clextral, Firmeny-Cedex, France), with co-rotating screws, through a slit die of 13 mm wide by 1 mm thick. The following extrusion conditions were followed:

| | |
|---|---|
| Screw diameter (mm) | 24 |
| Screw length (mm) | 400 |
| Screw speed (rpm) | 100 |
| Residention time inside the extruder barrel (sec) | 40 |
| Solid feed rate (kg/h) | 3.50 (water content: 12.3% w.b.) |
| Water flow rate (l/hr) | 2.14 |
| Total amount of water inside the barrel (kg/h) | 2.57 (water content: 45.6% w.b.) |

Temperature of the three heating zones along the barrel from the feed end (° C.): 85, 85 and 70

The extruded xanthan gum was then dried in a vacuum oven (Sanyo Gallenkamp PLC) at 65° C. for approximately 72 hours under a pressure of 1000 mbar. The extruded xanthan gum was then ground using a Cyclotec mill fitted with a 0.25 mm sieve, at room temperature, to a particle size between 125 and 250 μm. The final water content was lower than 8% (wet basis).

Determination of viscosity was performed using a Synchro-Lectric LVT Brookfield viscometer (Brookfield Engineering Laboratories inc., Stoughton Mass., USA) with a spindle 3 and a rotational speed of 12 rpm. The extruded xanthan gum was dispersed within 2 minutes in distilled water at 25° C. at a concentration of 0.7% based on the dry weight of xanthan using a method comprising introducing 500 ml of distilled water to a beaker of 1000 ml, stirring with a four bladed impeller with a diameter of 5 cm, operating at fixed rate of 300 rpm and adding the xanthan gum to give a concentration of 0.7% based on the dry weight of xanthan. The viscosity value measured was 8510 mPa·s.

The following unprocessed commercial xanthan gum were also evaluated: xanthan gum Satiaxane CX 910 (Degusa); xanthan gum E415 (CPKelco); xanthan gum pH Rapid (Tic Gums). The dispersion conditions and concentrations (0.7%) were the same. The viscosity was again measured using a Synchro-Lectric LVT Brookfield viscometer (Brookfield Engineering Laboratories inc., Stoughton Mass., USA) with a spindle 2 (the viscosity was too low to measure reliably using spindle 3) and a rotational speed of 12 rpm. The following results were obtained.

TABLE 1

| Material | Temperature (° C.) | Rotational speed (rpm) | Spindle | Viscosity (mPa · s) |
|---|---|---|---|---|
| Unprocessed commercial xanthan gum | | | | |
| Satiaxane CX910 (Degusa) | 25 | 12 | 2 | 130 |
| E415 (CPKelco) | 25 | 12 | 2 | 387 |
| PH Rapid (Tic Gums) | 25 | 12 | 2 | 392 |

Example 2

Dispersions of the xanthan gum preparations as described in example 1 were stirred for further 20 minutes and the viscosities changed to the following values.

TABLE 2

| Material | Temperature (° C.) | Rotational speed (rpm) | Spindle | Viscosity (mPa · s) |
|---|---|---|---|---|
| Extruded xanthan gum | | | | |
| Satiaxane CX910 (Degusa) | 25 | 12 | 3 | 7767 |
| unprocessed commercial xanthan gum | | | | |
| Satiaxane CX910 (Degusa) | 25 | 12 | 2 | 1158 |
| E415 (CPKelco) | 25 | 12 | 2 | 1204 |
| PH Rapid (Tic Gums) | 25 | 12 | 2 | 975 |

Example 3

The processed xanthan gum of Example 1 was dispersed in distilled water for one minute using the conditions described in Example 1. Solid NaCl was added to give a final concentration of 0.01M. Next, the viscosity was measured as described in Example 2 after 20 minutes stirring. A viscosity value of 1425 mPas was obtained.

Example 4

Unprocessed xanthan gum (Satiaxane CX 910, Degusa Texturant Systems, France) was blended with the following materials: maltodextrin (maltodextrin DE5, Cerestar UK LTD, Manchester UK); rye flour (Doves farm foods, Salisbury UK); wheat flour (Viking strong bread flour, Whitworth Bros., Victoria Mills Wellingbourough UK) (designated as carriers), at proportions of 1:1. The homogeneous blends were subsequently co-extruded, ground and sieved under the conditions described in example 1.

1.4% of these co-extruded mixtures based on the dry weight of the co-extruded mixtures (0.7% xanthan gum/0.7% carriers) were dispersed in distilled water and the dispersions' viscosities were evaluated following the method described in example 1 and 2.

TABLE 5

| | 2 minute stirring | | | |
|---|---|---|---|---|
| Material | Temperature (° C.) | Rotational speed (rpm) | Spindle | Viscosity (mPa · s) |
| co-extruded maltodextrin/xanthan | 25 | 12 | 3 | 4550 |
| co-extruded rye flour/xanthan | 25 | 12 | 3 | 5883 |
| co-extruded wheat flour/xanthan | 25 | 12 | 3 | 9500 |

TABLE 6

| | 20 minute stirring | | | |
|---|---|---|---|---|
| Material | Temperature (° C.) | Rotational speed (rpm) | Spindle | Viscosity (mPa · s) |
| co-extruded maltodextrin/xanthan | 25 | 12 | 3 | 7316 |
| co-extruded rye flour/xanthan | 25 | 12 | 3 | 9000 |
| co-extruded wheat flour/xanthan | 25 | 12 | 3 | 11017 |

Example 5

Xanthan gum (Satiaxane CX 910, Degusa Texturant Systems, France) was dispersed in water at a concentration of 5% based on the dry weight of xanthan, at room temperature, and subsequently drum dried The operating conditions were:

| Steam preasure (bar) | 1.3 |
|---|---|
| Drum rotation speed (rpm) | 3 |
| Xanthan gum water content after drum drying (%) | 17 (w.b.) |

The post drum drying process was the same as described in example 1. 0.7% of drum dried xanthan gum based on the dry weight of drum dried xanthan gum was dispersed in distilled water and its viscosity evaluated following the method described in example 1 and 2.

TABLE 7

| Material | Temperature (° C.) | Rotational speed (rpm) | Spindle | Viscosity (mPa · s) |
|---|---|---|---|---|
| Drum dried xanthan gum stirred for 1 min. | | | | |
| Satiaxane CX910 (Degusa) | 25 | 12 | 3 | 3117 |
| Drum dried xanthan gum stirred for 20 min. | | | | |
| Satiaxane CX910 (Degusa) | 25 | 12 | 3 | 4017 |

Example 6

10 g of the processed xanthan gum according to Example 1 was dispersed in 500 ml of 0.1M NaCl aqueous solution of 25° C. and stirred for 2 minutes at a speed of 300 rpm. A 25 g aliquot of the dispersion was than transferred to a Rapid Viscosity Analyser (Newport Scientific, Warriewood, Australia). The viscosity was followed on heating to 95° C. and subsequent cooling. The temperature and viscosity profiles shown in FIG. 1 (determined in a Rapid Viscosity Analyser) are indicative of the initial swelling of the particulate xanthan, disruption of this structure causing an initial viscosity release and subsequent formation of a molecularly dispersed ordered structure on cooling. It can be seen that the viscosity-temperature profile resembles that typically obtained for starches and cereal flours.

Example 7

Figure 2:
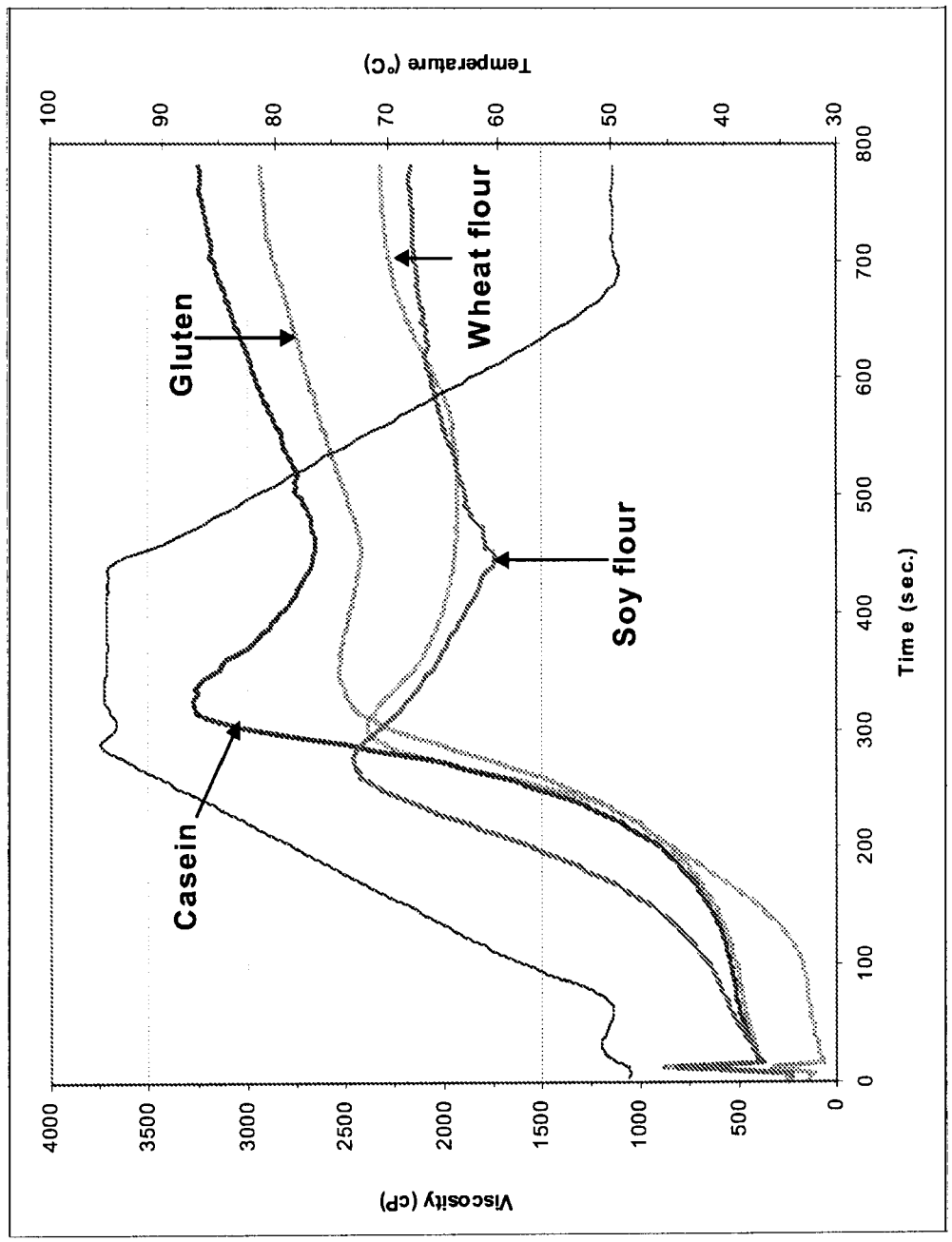
FIG. 2: Shows the Viscosity and Temperature Profile of 1:1 Coextruded Blends of Xanthan with other Biopolymers.

Unprocessed xanthan gum (Satiaxane CX 910, Degusa Texturant Systems, France) was blended with soya flour (Soja Austria SAN, Wien Austria), gluten (Amygluten 140) and rennet casein (high protein milk extract, Kerry Foods, Ltd.), at proportions of 1:1. The homogeneous blends were subsequently co-extruded, ground and sieved under the conditions described in example 1. The viscosity of compositions containing 2% xanthan (solvent 0.1M NaCl) was measured as described in Example 6. The results are shown in FIG. 2.

Example 8

1% xanthan gum and 1:1 coextruded blends were dispersed for two hours in 1% KCl at a temperature of 75° F. The inhomogeneous nature of the suspension (particles sank to the bottom of the beaker) made it impossible to obtain a sensible measure of viscosity using a Brookfield viscometer although when this was attempted the values were always below 100 mPas. On heating to 100° C. and subsequent cooling to 75° F. over a period of two hours viscosity values measured with a Brookfield LVT, spindle no 3 and a speed of 60 rpm were as follows;

TABLE 8

| Sample | Viscosity after heating and cooling (MPas) |
|---|---|
| Extruded xanthan gum (Satiaxnae CX910) | 1050 |
| Co-extruded casein and xanthan (1:1 blend) | 1026 |
| Co-extruded gluten and xanthan (1:1 blend) | 1107 |
| Co-extruded soy four and xanthan (1:1 blend) | >2000 |

The invention claimed is:

1. A composition comprising by weight of dry matter at least 50% of xanthan gum and not more than 30% of starch, wherein the xanthan gum is not treated with glyoxal or adipoyl chloride and the xanthan gum can be dispersed completely within 2 minutes in distilled water at 25° C. at a concentration of 0.7% based on the dry weight of xanthan determined by a method comprising introducing 500 ml of distilled water to a beaker of 1000 ml, stirring the water with a four bladed impeller of 5 cm diameter operating at fixed rate of 300 rpm, and adding the composition to the water until a concentration of 0.7% based on the dry weight of xanthan is reached,
wherein the composition has a first viscosity of less than 500 mPa·s at 23.8° C. and a second viscosity of at least 600 mPa·s at 23.8° C.,
wherein both the first and second viscosities are determined according to Section 172.695, Title 21, Volume 3 of the Code of Federal Regulations of the U.S. Food and Drug Administration,
the first viscosity measurement comprising the steps of:
a) adding the composition to an aqueous solution containing 1 wt. % potassium chloride to give an aqueous composition containing 1 wt. % xanthan gum;
b) stirring for 2 hours; and
c) determining the viscosity of the stirred aqueous composition by Brookfield viscometer Model LVF viscometer or equivalent using a No. 3 spindle at 60 rpm; and
the second viscosity measurement comprising the steps of:
d) heating the stirred aqueous composition of (c) immediately after the first viscosity measurement to a temperature of 100° C.;
e) maintaining a temperature of 100° C. for one minute;

f) cooling to 23.8° C. within 120±10 minutes; and
g) determining the viscosity by Brookfield viscometer Model LVF or equivalent using a No. 3 spindle at 60 rpm.

2. The composition according to claim 1, when subjected to a first viscosity measurement and a second viscosity measurement as defined in claim 1, yields a viscosity from the second viscosity measurement that is at least 50% higher than the viscosity from the first viscosity measurement.

3. The composition according to claim 1, wherein the viscosity of the dispersion obtained after the 2 minutes of stirring is at least 2000 mPa·s at 25° C. measured by a Brookfield model LVF viscometer or equivalent using spindle 3 at a rotational speed of 12 rpm.

4. The composition according to claim 1, wherein the viscosity of the dispersion obtained after the 2 minutes of stirring is one fifth or less of the original viscosity when solid NaCl is added and fully dissolved to give an ionic strength of 0.05 M.

5. The composition according to claim 1, wherein the viscosity of the dispersion obtained after the 2 minutes of stirring does not increase by more than 100% on further stirring for 20 minutes.

6. The composition according to claim 1 further comprising at least 10% polysaccharide or protein by weight of xanthan gum, wherein the viscosity of the dispersion obtained after 10 minutes of stirring is at least 2000 mPa·s at 25° C. as measured by a Brookfield model LVF viscometer using spindle 3 at a rotational speed of 12 rpm.

7. The composition according to claim 6, wherein the viscosity of the dispersion obtained after the 10 minutes of stirring is one fifth or less of the original viscosity when solid NaCl is added and fully dissolved to give an ionic strength of 0.05 M.

8. The composition according to claim 6, wherein the viscosity of the dispersion obtained after the 10 minutes of stirring does not increase by more than 100% on further stirring for 20 minutes.

9. The composition according to claim 1 which exhibits a volume weighted average particle size between 10-1000 μm.

10. The composition according to claim 1, wherein the xanthan gum has not been chemically treated.

11. An aqueous dispersion of discrete swollen particles comprising the composition according to claim 1.

12. The aqueous dispersion according to claim 11 wherein the composition is essentially free of starch.

13. The aqueous dispersion according to claim 11 comprising between 0.1 and 30 wt. % xanthan gum.

14. A food product comprising an aqueous dispersion of the composition according to claim 1.

15. The food product according to claim 14, wherein said food product is selected from the group consisting of desserts, fillings, batters, doughs and spreads.

16. A pharmaceutical composition comprising a pharmaceutically active substance and an aqueous dispersion of discrete swollen particles comprising the composition according to claim 1.

17. A process for preparing a xanthan gum solution comprising:
(a) dispersing in aqueous liquid a composition according to claim 1; and
(b) heating the resulting dispersion to a temperature sufficient to denature the xanthan gum.

18. A composition comprising by weight of dry matter at least 50% of xanthan gum and not more than 30% starch, wherein the xanthan gum is not treated with glyoxal or adipoyl chloride and wherein said xanthan gum can be dispersed completely within 2 minutes in distilled water of 25° C. at a concentration of 0.7% based on the dry weight of xanthan by a method comprising:
(i) introducing 500 ml of distilled water to a beaker of 1000 ml, and
(ii) while stirring with a stirrer with a four bladed impeller with a diameter of 5 cm operating at fixed rate of 300 rpm, adding the composition to the water until a concentration of 0.7% based on the dry weight of xanthan is reached,
wherein, following complete dispersal of the composition in distilled water, the xanthan gum is present in the resulting aqueous dispersion in the form of discrete swollen particles and wherein the average diameter of the swollen particles, when stored at 20° C. for 24 hours, does not change by more than 30%.

* * * * *